A. C. KEEDWELL.
NUT LOCK.
APPLICATION FILED MAY 14, 1908.
915,772.  Patented Mar. 23, 1909.
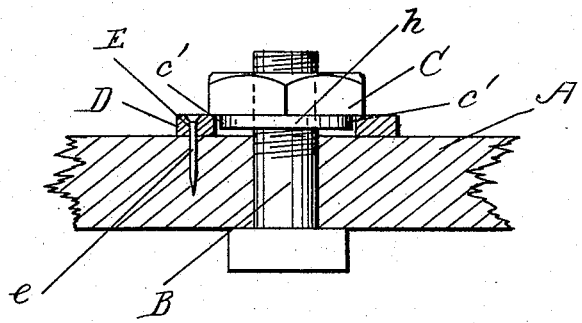
FIG_1_
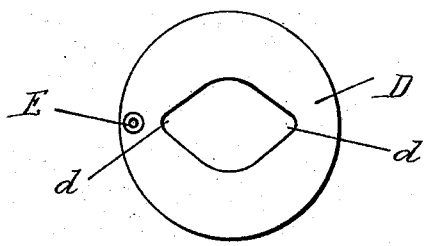
FIG_2_
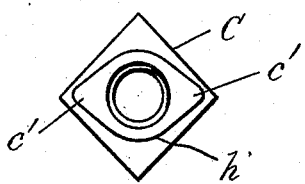
FIG_3_
WITNESSES:  
W. Lagomarsino Jr.  
A. Wagner.
INVENTOR  
Albert C. Keedwell.  
BY Herbert W. Jenner.  
Attorney

UNITED STATES PATENT OFFICE.

ALBERT CHARLES KEEDWELL, OF NEW YORK, N. Y.

NUT-LOCK.

No. 915,772.  Specification of Letters Patent.  Patented March 23, 1909.

Application filed May 14, 1908. Serial No. 432,925.

*To all whom it may concern:*

Be it known that I, ALBERT C. KEEDWELL, residing at New York city, in the State of New York, have invented certain new and useful Improvements in Nut-Locks; and I do hereby declare the following to be a full, clear, and exact description of the invention, such as will enable others skilled in the art to which it appertains to make and use the same.

This invention relates to nut-locks provided with base-washers; and it consists in the novel construction and combination of the parts hereinafter fully described and claimed.

In the drawings, Figure 1 is a side view of a bolt provided with a nut-lock according to this invention and showing the base-washer in section. Fig. 2 is a plan view of the base-washer. Fig. 3 is a plan view of the nut, from below.

A is a portion of a plank or other support, and B is a bolt which is placed in a hole in the plank and provided with a nut C. The nut C is provided on its underside with an oblong or elliptical boss $h$, the end portions $c'$ of which form projections which are arranged diametrically opposite to each other at two of the angles between the sides of the nut.

D is a base-washer which is slipped over the bolt and arranged between the nut and the plank or support. This washer has two slots $d$, arranged one on each side of its hole for the projections $c'$ to engage with. The bolt-hole of the washer is large enough to admit the boss $h$.

E is a hole near the periphery of the washer, clear of the nut, and $e$ is a nail which is inserted through the hole E and driven into the plank.

When the nut is being screwed up, its projections slip into the slots, and the washer is thereupon revolved by the nut until the nut is screwed up tight. The nail is then driven through the hole E so that the nut and washer are locked. If the projections $c'$ strike the flat part of the washer between the slots, the elasticity of the parts permits the faces of the projections to slide on the face of the washer until they spring into the slots, or the washer can be turned around a little with the fingers, so that the parts can interlock.

What I claim is:

In a nut-lock, the combination, with a support, a bolt, and a nut screwed on the said bolt and having a flat bottom provided with a boss around its hole having two projections arranged diametrically opposite to each other at two of the angles between the sides of the nut; of a normally revoluble base-washer having an opening and slots which engage with the said boss and its projections, and a removable locking-pin for securing the said base-washer to the said support after the nut is fully screwed up.

In testimony whereof I affix my signature, in presence of two witnesses.

ALBERT CHARLES KEEDWELL.

Witnesses:
 C. S. ANDREWS, Jr.,
 GEO. W. BRYAN.